United States Patent [19]

Hall et al.

[11] Patent Number: 5,366,068
[45] Date of Patent: Nov. 22, 1994

[54] CONVEYOR BELT/CUTTING HEAD ADVANCE MECHANISM

[75] Inventors: Kevin R. Hall, Wollongong; Gordon Wilkinson, Unanderra, both of Australia

[73] Assignee: Australian Longwall Pty. Limited, New South Wales, Australia

[21] Appl. No.: 65,544

[22] Filed: May 20, 1993

[51] Int. Cl.$^5$ ............................................. B65G 21/14
[52] U.S. Cl. ................................... 198/812; 198/588; 198/313
[58] Field of Search ................. 198/313, 588, 594, 812

[56] References Cited

U.S. PATENT DOCUMENTS

| | | | |
|---|---|---|---|
| 2,576,217 | 11/1951 | Eggleston | 198/313 |
| 2,863,553 | 12/1958 | Nordquist | 198/812 X |
| 2,925,901 | 2/1960 | Hallman | 198/812 |
| 4,771,880 | 9/1988 | Mraz | 198/812 |
| 4,860,878 | 8/1989 | Mraz et al. | 198/812 X |
| 4,896,764 | 1/1990 | Neunzert | 198/812 |
| 5,046,603 | 9/1991 | Odenthal | 198/812 |

FOREIGN PATENT DOCUMENTS

| | | | |
|---|---|---|---|
| 0157286 | 10/1985 | European Pat. Off. | |
| 348267 | 5/1931 | United Kingdom . | |
| 0372130 | 5/1973 | U.S.S.R. | 198/812 |
| 1018885 | 5/1983 | U.S.S.R. | 198/588 |
| 1407861 | 7/1988 | U.S.S.R. | 198/812 |

*Primary Examiner*—James R. Bidwell
*Attorney, Agent, or Firm*—Ladas & Parry

[57] ABSTRACT

Disclosed is a conveyor belt/cutting head advancement mechanism (10). Mechanism (10) comprises a conveyor belt support structure (11) connected at one end to a conveyor belt gathering structure (12). The conveyor belt support structure (11) is typically interconnected at its forward end to a self advancing conveyor return end (not shown). Material removed from a mine face by the cutting implement is delivered to a conveyor belt supported by the support structure (11). Structure (11) comprises a plurality of structural elements (18) pivotally interconnected in a scissor-like configuration. The mid points of elements (18) are pivotally interconnected at a point coinciding with the mounting location of a conveyor belt return roller (16). At the upper pivotally interconnected extremities of elements (18), the conveyor belt advancing rollers are supported. Mounted at a location nearby the lower ends of elements (18) are ground engaging wheels (17). The conveyor belt gathering structure (12) comprises a frame (19) within which is mounted a pair of gathering roller groups (21 and 22). One or both of the gathering roller groups may be mounted upon sub-frames which may longitudinally traverse frame (19). A winch or hydraulic ram (20) may be employed to effect such longitudinal traverse. As roller groups (21) and 22) are caused to move apart, the length of belt (14) gathered thereby is many times greater than the distance through which the roller pairs (21 and 22) have separated.

7 Claims, 4 Drawing Sheets

CONVEYOR BELT/CUTTING HEAD ADVANCE MECHANISM

FIELD OF THE INVENTION

The following invention relates to an advancing mechanism to progressively advance a conveyor belt leading end with an underground cutting machine.

During the cutting of an underground mine face, the mine cutter advances away from the conveyor belt structure situated in the mine tunnel. It is required that the conveyor belt structure be advanced toward the cutting machine at various intervals during cutting. Such operations are time consuming and labor intensive.

OBJECT OF THE INVENTION

It is the object of the present invention to overcome or substantially ameliorate the above disadvantage.

SUMMARY OF THE INVENTION

There is disclosed herein an apparatus comprising;

an extendible/contractable conveyor belt support structure, a conveyor belt gathering structure connected to one end of the support structure and comprising a plurality of rollers, a conveyor belt supported upon the support structure and gathered upon the rollers, and means to effect extension and contraction of the support structure wherein the conveyor belt is gathered upon or ungathered from the gathering structure.

Preferably, the conveyor belt support structure comprises a plurality of structural elements interconnected in a scissor-like configuration wherein a pair of elements pivotally cross at respective mid points thereof and an adjacent pair of like-crossed element is pivotally connected at distal ends thereof to respective distal ends of the first said crossed pair of elements.

Preferably conveyor belt advance rollers are rotatably mounted at the distal pivotally connected ends of an adjacent pair of crossed elements.

Preferably conveyor belt return rollers are rotatably connected at the said mid points.

Preferably the conveyor belt support structure comprises a plurality of ground engaging wheels supported by at least some of said structural elements.

Preferably the conveyor belt gathering structure comprises a rigid frame supporting a pair of sets of gathering rollers at opposing ends thereof. Upon extension of the support structure the sets of gathering rollers are caused to move toward one another such that the conveyor belt gathered therearound and therebetween may be dispensed from the gathering structure.

Preferably the frame of the gathering structure is supported on ground engaging wheels.

BRIEF DESCRIPTION OF THE DRAWINGS

A preferred form of the present invention will now be described by way of example with reference to the accompanying drawings, wherein.

DETAILED DESCRIPTION OF THE PREFERRED EMBODIMENT

Figure 1:
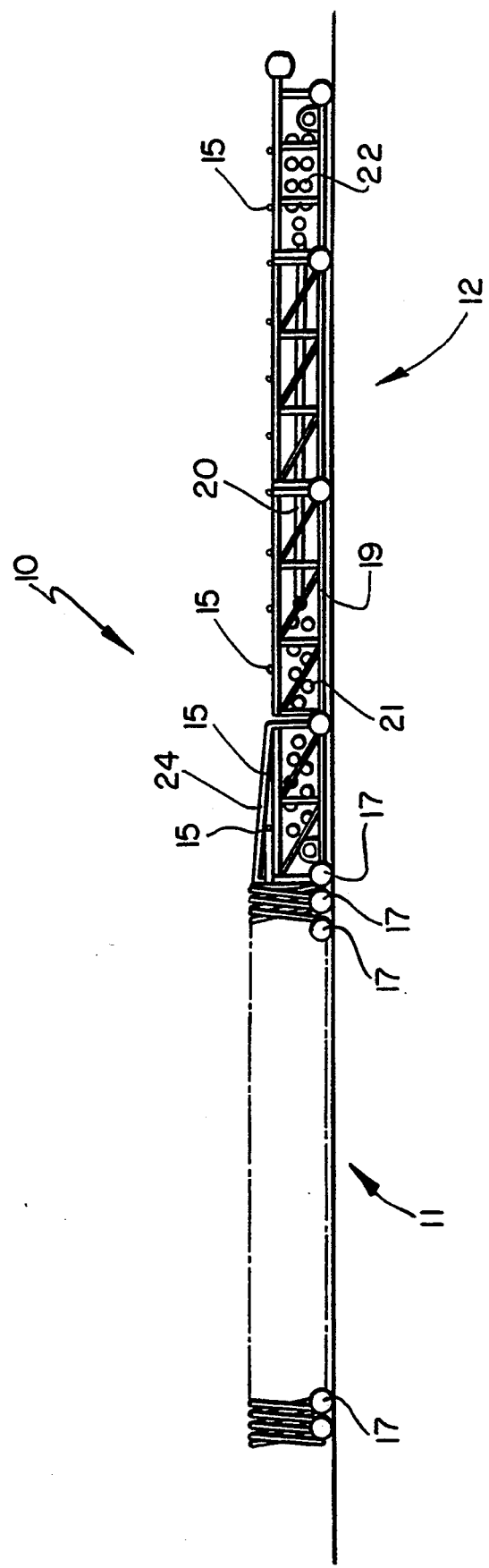
FIG. 1 is a schematic elevational view of a conveyor belt/cutting head advance mechanism.

In the accompanying drawings there is schematically depicted a conveyor belt/cutting head advancement mechanism generally indicated by reference numeral 10. Mechanism 10 comprises a conveyor belt support structure 11 connected at one end to a conveyor belt gathering structure 12. The conveyor belt support structure 11 is typically interconnected at its forward end to a self advancing conveyor return end (not shown). That is, material removed from the mine face by the cutting implement is delivered to a conveyor belt supported by support structure 11.

Figure 2:
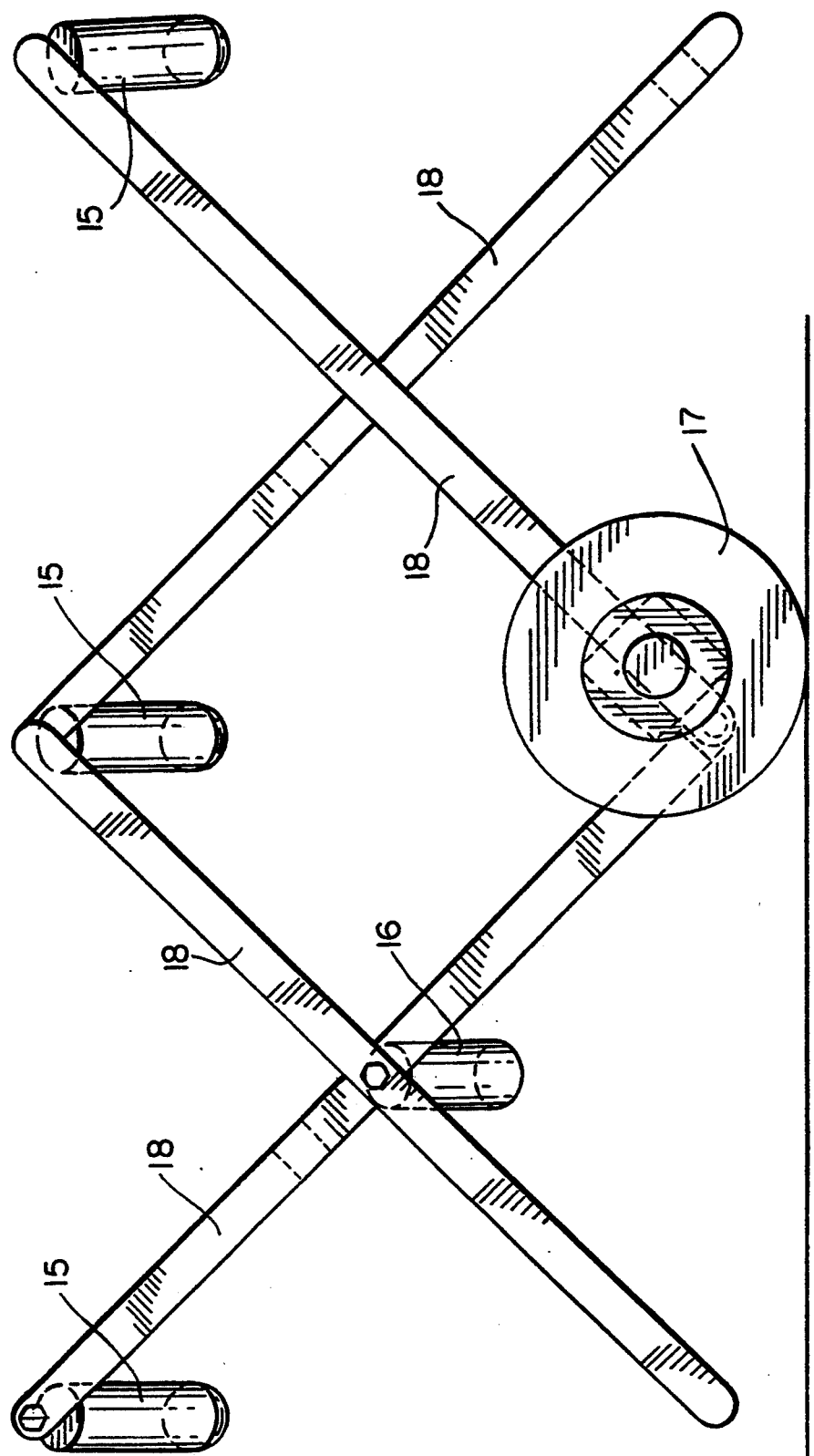
FIG. 2 is a schematic elevational view of a conveyor belt support structure forming part of the mechanism of FIG. 1.
Figure 4:
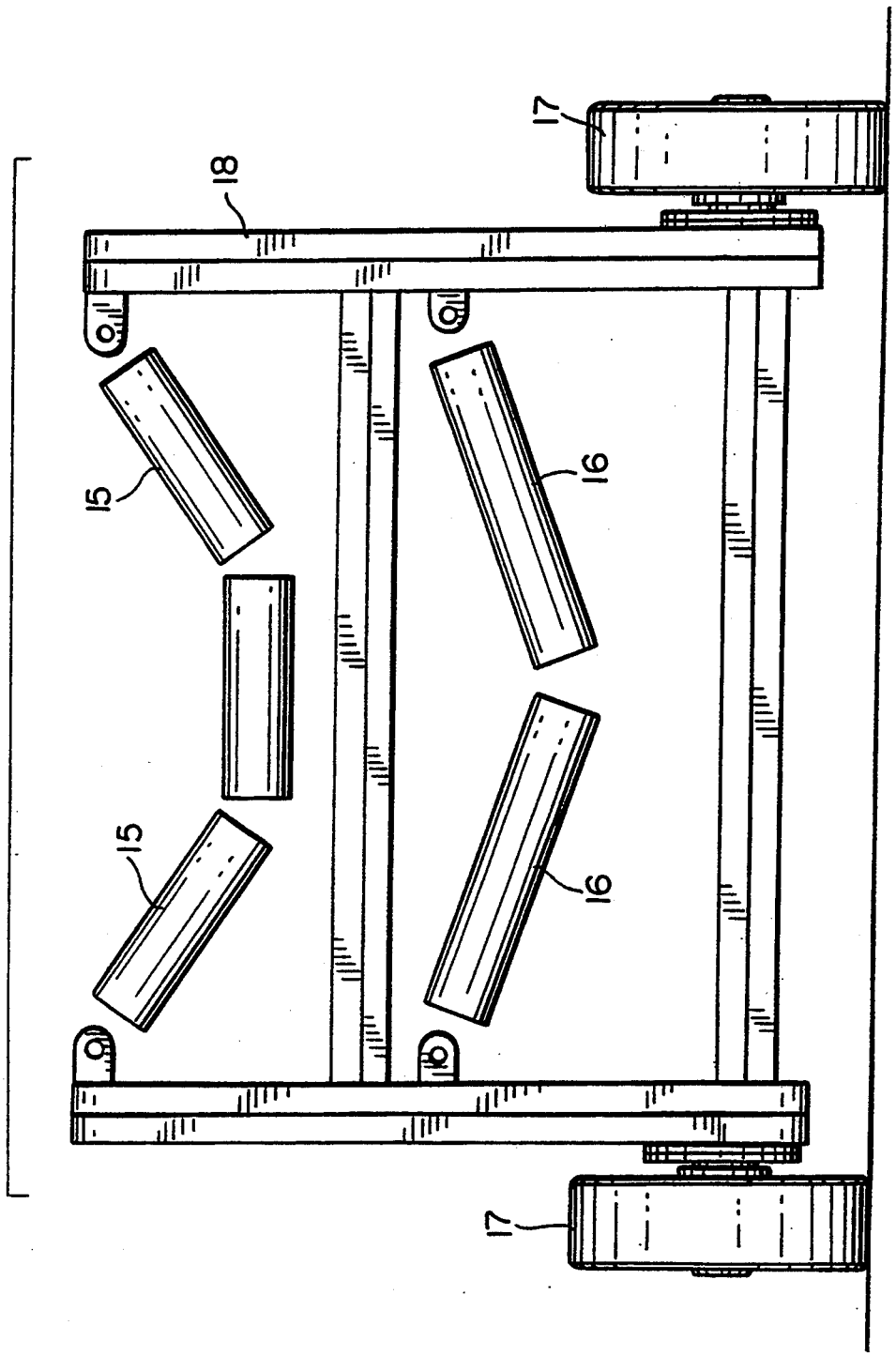
FIG. 4 is a schematic and elevational view of the structure of FIG. 2.

Conveyor belt support structure 11 is depicted in more detail in FIG. 2. The structure 11 comprises a plurality of structural elements 18 pivotally interconnected in a scissor-like configuration. The mid points of elements 18 are pivotally interconnected at a point coinciding with the mounting location of a conveyor belt return roller 16. At the upper pivotally interconnected extremities of elements 18 the conveyor belt advancing rollers 15 are supported. It should be appreciated that return rollers 16 are not located at every interval of the scissor-like structure. As seen in FIG. 4, three advancing rollers 15 are mounted at the pivotably interconnected extremities 18 and form a trough-like arrangement for the support of the upper run of the conveyor belt whereas two return rollers 16 are mounted at an angle at the pivotably interconnected midpoints to form a bowed arrangement for the support of the lower run of the conveyor belt.

Mounted at a location nearby the lower ends of elements 18 is a ground engaging wheel 17.

Figure 3:
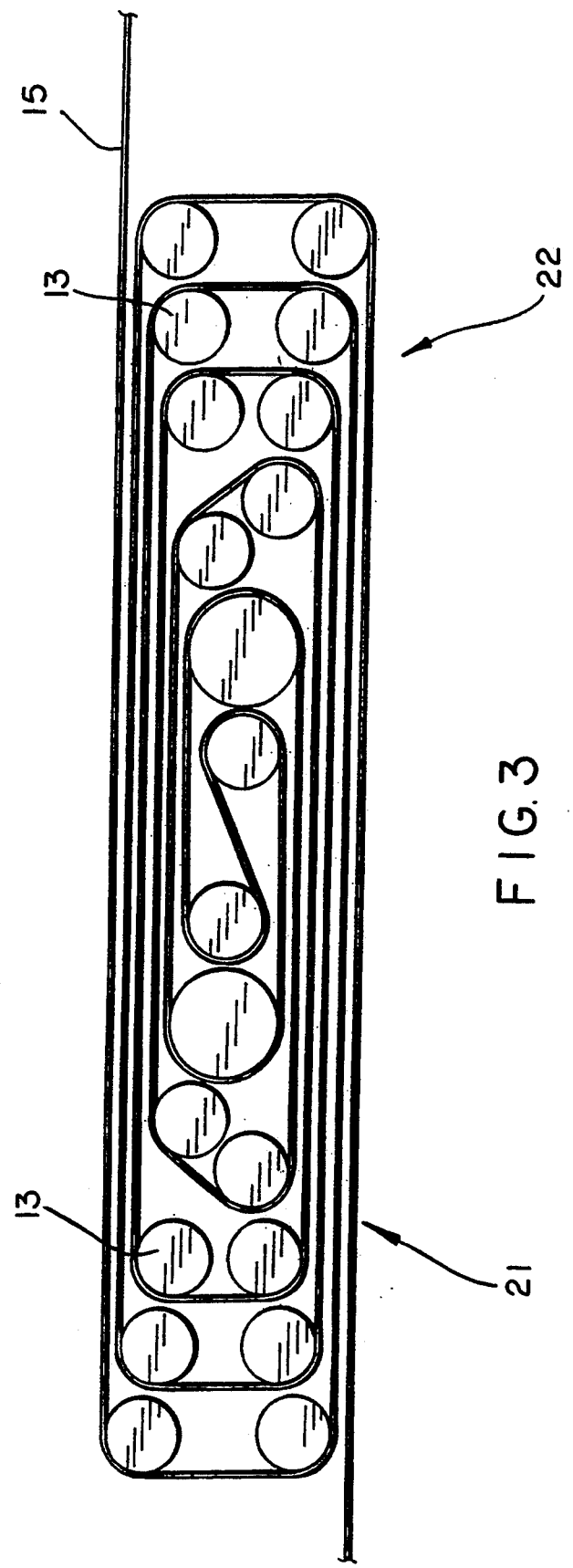
FIG. 3 is a schematic elevational view of a conveyor belt gathered around a number of rollers forming part of a gathering structure of the mechanism of FIG. 1.

The conveyor belt gathering structure 12 comprises a frame 19 within which is mounted a pair of gathering roller groups 21 and 22. One or both of the gathering roller groups may be mounted upon subframes which may longitudinally traverse frame 19. A winch or hydraulic ram 20 may be employed to effect such longitudinal traverse. The configuration of conveyor belt 14 about gathering roller groups 21 and 22 is best depicted in FIG. 3. In this preferred embodiment each group of rollers comprises ten rollers 13. The conveyor belt extends from the lower left hand corner of FIG. 3 from the conveyor belt support structure return rollers 16. At the upper right hand corner of FIG. 3 the conveyor belt 14 extends from a conveyor belt drive mechanism (not shown) which has drawn the belt 14 across advance rollers 15. Frame 19 further comprises a number of advance rollers 15 to support conveyor belt 14.

As roller groups 21 and 22 are caused to move apart it can be seen that the length of belt 14 gathered thereby is many times greater than the distance through which the roller pairs 21 and 22 have separated.

In use the conveyor belt support structure may be caused to extend or retract by way of hydraulic means or otherwise, during which time the roller groups 21 and 22 will either separate or move toward each other at a rate sufficient to gather or dispense with belt 14. As the upper extremities of elements 18 of support structure will move vertically during extension or contraction of the structure, a pivoting ramp 24 is provided between frame 19 and support structure 11. Ramp 24 may support a number of rollers 15.

As the mine face is progressively cut away the support structure will correspondingly extend and contract thus drawing gathering structure 12 toward the mine face.

When the cutting machine has advanced sufficiently to fully extend support structure 11 and is required to advance further, then the belt gathering structure 12 is advanced and support structure 11 contracted.

It should be appreciated that modifications and alterations obvious to those skilled in the art should not be considered as beyond the scope of the present invention. For example any means of effecting the longitudinal movement of gathering roller groups 21 or 22 may be provided. That is rather than the provision of a hydraulic ram 20 a cable mechanism or rack and pinion drive may be provided. Furthermore, any number of gathering rollers may be provided to allow for differing degrees of belt gathering.

We claim:

1. An apparatus comprising:
   an extendable/contractible conveyor belt support structure comprising a plurality of structural elements interconnected in a scissor-like configuration, wherein a pair of elements pivotally cross at respective mid-points thereof, and an adjacent pair of like-crossed elements is pivotally connected at upper and lower distal ends thereof to respective upper and lower distal ends of the first said crossed pair of elements, the conveyor belt support structure further comprising a plurality of conveyor belt advancing roller sets, each mounted to respective structural elements and including a plurality of conveyor rollers forming a trough-like support for the conveyor belt, and a plurality of ground engaging wheels directly supported by at least some of said structural elements nearby the lower ends thereof,
   a conveyor belt gathering structure connected to one end of the support structure and comprising a plurality of rollers,
   a conveyor belt supported upon the support structure and gathered upon the rollers of the gathering structure, and
   means to effect extension and contraction of the support structure wherein the conveyor belt is gathered upon or ungathered from the gathering structure.

2. The apparatus of claim 1, comprising a plurality of conveyor belt return rollers rotatably connected at the said mid points of said structural elements.

3. The apparatus of claim 1 wherein the conveyor belt gathering structure comprises a rigid frame supporting a pair of sets of gathering rollers at opposing ends thereof.

4. The apparatus of claim 3 wherein one or both of the gathering roller sets is mounted upon a respective sub-frame which is adapted to longitudinally traverse the frame.

5. The apparatus of claim 3 wherein the frame of the gathering structure is supported on ground engaging wheels.

6. The apparatus of claim 1, wherein the conveyor rollers of each advancing roller set are inclined with respect to one another to form said trough-like support for the conveyor belt.

7. The apparatus of claim 2, wherein the conveyor rollers of each advancing roller set are inclined with respect to one another to form said trough-like support for the conveyor belt and said return rollers are also inclined with respect to one another to form a bowed support for the conveyor belt.

* * * * *